Figure 1:
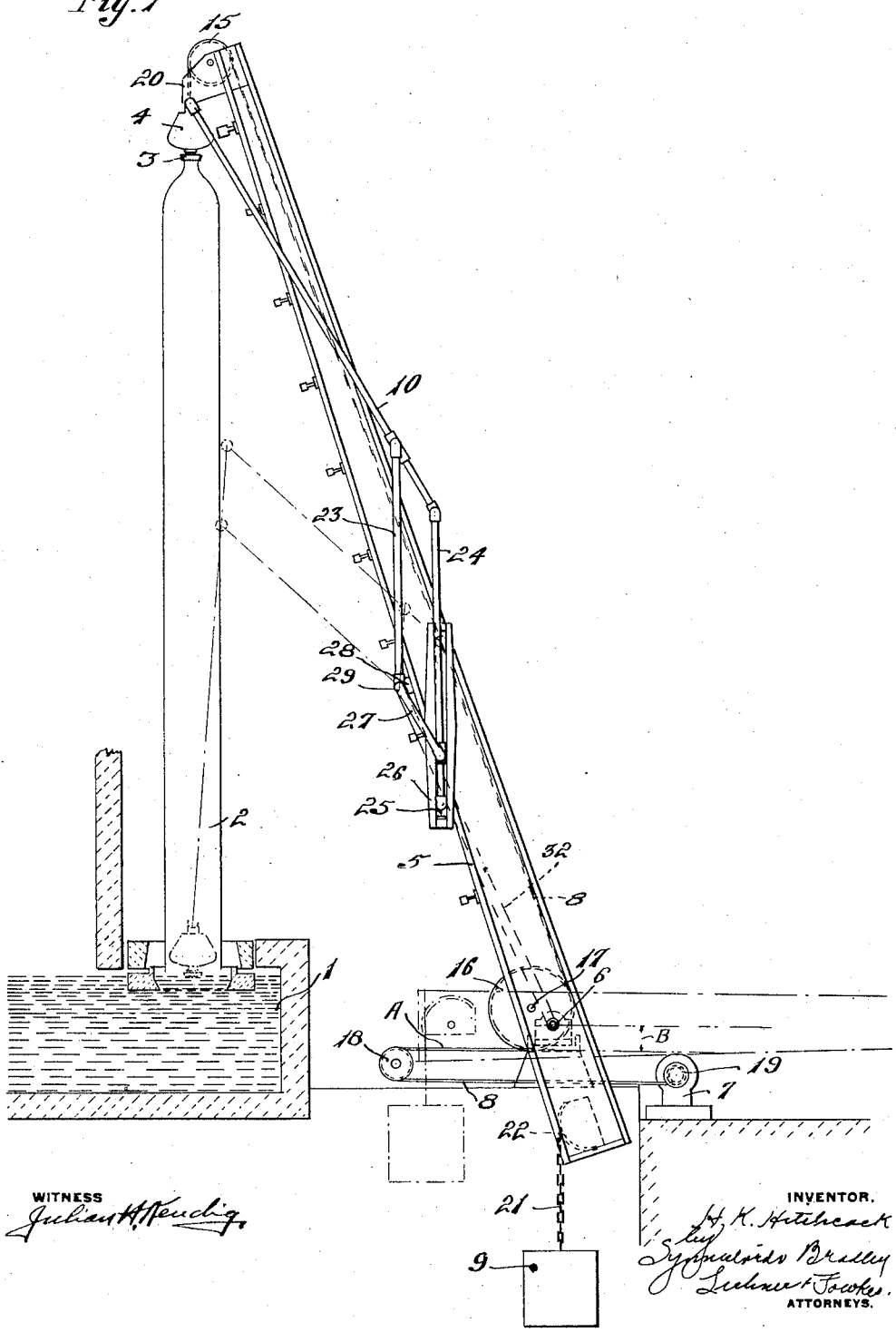

H. K. HITCHCOCK.
GLASS DRAWING APPARATUS.
APPLICATION FILED OCT. 8, 1917.

1,328,673.

Patented Jan. 20, 1920.
2 SHEETS—SHEET 1.

WITNESS

INVENTOR.
H. K. Hitchcock
ATTORNEYS.

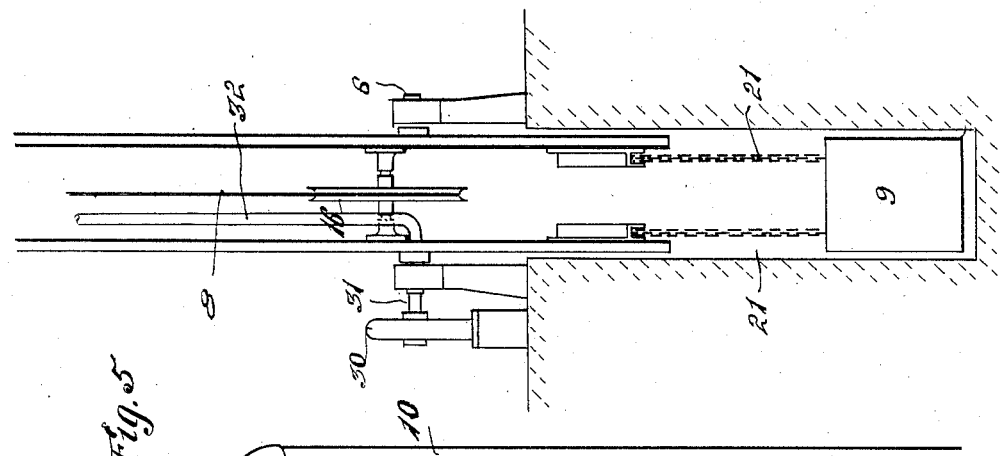
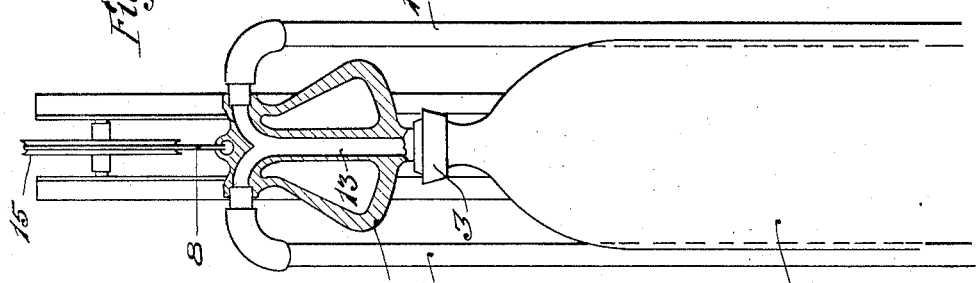
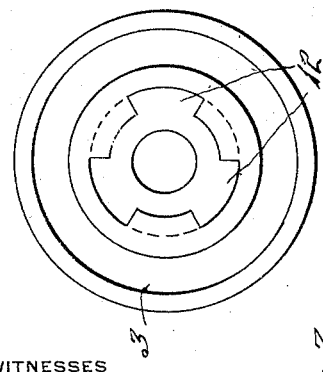
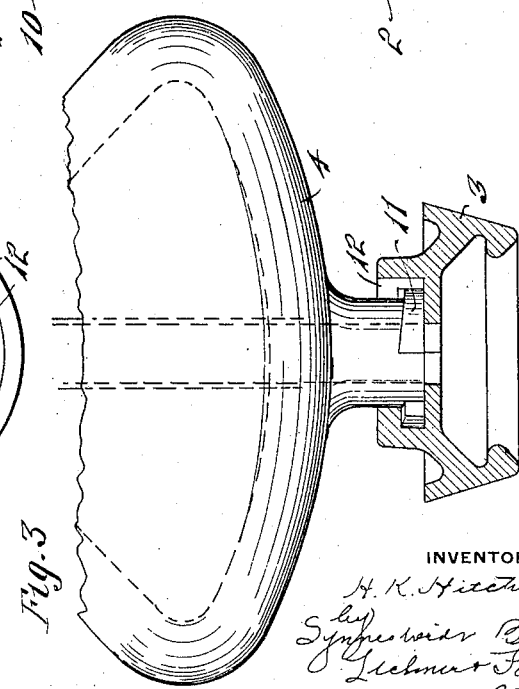

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

GLASS-DRAWING APPARATUS.

1,328,673.  Specification of Letters Patent.  Patented Jan. 20, 1920.

Application filed October 8, 1917. Serial No. 195,437.

*To all whom it may concern:*

Be it known that I, HALBERT K. HITCHCOCK, a citizen of the United States, residing at Pittsburgh, in the county of Allegheny and State of Pennsylvania, have invented certain new and useful Improvements in Glass-Drawing Apparatus, of which the following is a specification.

The invention relates to apparatus for drawing glass articles, particularly the cylinders from which window glass is made. It has for its primary objects; the provision of an arrangement of combined drawing and take-down apparatus, (1) wherein improved means are provided permitting of a supply of air to the bait without the use of flexible tubing and for guiding and steadying the bait during the drawing operation, (2) wherein improved means are provided for operating the drawing means and swinging the take-down apparatus, and (3) wherein improved means are provided for detachably securing the bait to the drawing device. One embodiment of the invention is illustrated in the accompanying drawings, wherein—

Figure 1 is a side elevation of the complete apparatus, the dot-and-dash lines showing certain of the parts when the bait is in lowered position and also when the frame is in horizontal position; Fig. 2 is a top view of the bait preferably employed; Fig. 3 is a partial side elevation and partial section showing the detachable connection between the bait and the weight employed; Fig. 4 is a front elevation, partially in section, of the upper part of the apparatus in the position illustrated in Fig. 1; and Fig. 5 is a partial bottom view of the apparatus of Fig. 1.

Referring to the general arrangement of parts as shown in Fig. 1, the numeral 1 indicates the drawing extension from which the glass cylinders 2 are drawn; 3 is the bait detachably secured to the weight 4; 5 is the tilting take-down apparatus pivoted upon the axle members 6; 7 is a motor for operating the cable 8 which lifts the bait; 9 is a counterweight; and 10, 10, are a pair of hollow arms by means of which air is supplied to the bait during the drawing operation.

The bait is detachably secured to the weight 4 by means of the connection illustrated in detail in Figs. 2 and 3, such connection including a plurality of lugs 11 upon the neck of the weight 4, and a slot in the upper portion of the bait with which the vertical grooves 12 communicate. In connecting the bait with the weight 4 the lugs 11 are caused to pass through the grooves 12 and the bait and weight rotated relatively to secure locking engagement, the upper surface of the lugs being inclined in order to give a tight joint when the parts are moved to locking position.

Air is supplied through the weight 4 by means of the passage 13 branching laterally at its upper end and communicating with the hollow arms 10, such arms having swivel connection with the weight to permit them to turn with respect thereto. The weight, in addition to acting as a connecting member, also serves to give the bait its downward movement before commencing a draw, and thus overhauls the line 8 by means of which the drawing operation is carried out.

The frame 5 carries at its upper end a pulley wheel 15 and at its lower end another pulley wheel 16, such latter pulley wheel being pivoted at 17. The operating line or cable 8 passes around these pulleys and also around the pulley 18 to the drum 19 of the operating motor.

The pivotal support 17 of the pulley 16 is placed off-center with respect to the axle member 6 upon which the tilting frame is mounted, the purpose being to automatically vary the speed of movement of the tilting frame in moving from the position in full lines to the horizontal position indicated in dot-and-dash lines. When the bait reaches its upper extreme of movement, the weight 4 takes against a member 20 secured to the top of the frame and further upward movement is stopped. When this upward movement of the bait is stopped, the continued application of power from the operating line 8 causes the frame to tilt, the operating line at the point A acting upon the periphery of the pulley 16 and having a leverage equal to the distance B. As the frame swings in a clockwise direction the center line 17 of the pulley gradually moves upward describing an arc, about the axle 6, so that the periphery of the pulley 16 is raised decreasing the distance B. If the motor is operating at a constant speed, this increases the speed of tilting of the frame and such increase in speed continues until the center 17 of the pulley 16 passes the vertical center line of the axle 6, after which time the periphery of the pulley moves down, thus decreasing the distance A. As a result the frame as it approaches its horizontal position, slows up.

The foregoing arrangement is advantageous since a relatively slow starting movement avoids undue strain upon the cylinder, and this is also true with respect to the concluding movement of the frame where it is desirable to avoid any undue shock. The more rapid movement at the central portion of the swing is desirable since time is saved at this point. On the reverse movement the counterweight 9 serves to swing the frame to upright position, and the weight 4 overhauls the line and carries the bait down to the position indicated in dot-and-dash lines, at which time it engages the molten glass preparatory to a new drawing operation.

The counterweight 9 is preferably carried by a pair of chains 21 (Fig. 5) and such chains are secured to the segmental pulley members 22, so that the chains wind on the pulley members as the frame moves to the horizontal position indicated in dot-and-dash lines in Fig. 1. The relation of the axle support 6 of the frame is such with respect to the point of suspension of the counterweight 9 that the frame will be normally moved to the position indicated in Fig. 1, when not acted upon by the motor.

The hollow arms 10 which serve to supply air to the bait are pivotally supported from the pipes 23 and 24. The pipes 24 are pivotally connected at their lower ends to the crossheads 25 slidably mounted in the guides 26 carried upon the sides of the frame. Short lengths of pipe 27 are pivotally connected at their ends to the pipes 23 and 24, and a bracket 28 fixed upon the frame supports the pipe at the pivotal connection 29 between the pipes 23 and 27, these being the points to which air is supplied. Air under pressure is provided from the blower 30. One of the axle members 6 is hollow and is connected with the blower 30 by means of the pipe 31 (Fig. 5). The hollow axle member 6 communicates with a pipe 32 leading to the pivotal connection 29. The pantograph arrangement of pipes as above described supports the hollow arms 10 so that their ends connected to the weight 4 follow the movement of such weight and the bait carried thereby, the parts assuming the position diagrammatically indicated by the dot-and-dash lines when the bait is lowered to the surface of the glass. The arrangement is advantageous in that the use of flexible piping and the reeling arrangement necessitated thereby is done away with. Furthermore, the use of guides for steadying the drawing mechanism during the drawing operation is avoided, as the arms 10 cause the bait to move in an exact vertical line and steady it as the bait moves up.

What I claim is:

1. In combination in apparatus for drawing glass articles from a bath of molten glass, a tilting take-down frame pivoted at its lower end adjacent the bath of glass, a bait and means for moving it vertically carried by the frame, an air supply, and a system of jointed pipes connected thereto and to the bait carried by the frame and so arranged that the end connected to the bait is caused to move substantially vertically with the bait throughout the drawing movement thereof.

2. In combination in apparatus for drawing glass cylinders from a bath of molten glass, a tilting take-down frame pivoted at its lower end adjacent the bath of glass, a bait, a cable for moving the bait vertically, an air supply for the bait, and a series of pivoted members carried by the frame with one of such members connected to the bait and with the members so arranged that the end of the arm connected to the bait is caused to move in a vertical line throughout the drawing operation.

3. In combination in apparatus for drawing glass articles from a bath of molten glass, a tilting take-down frame pivoted at its lower end adjacent the bath of glass, a bait and means for moving it vertically carried by the frame, an air supply, a parallelogram made up of members pivoted together, a part of which are hollow and connected to the air supply and one of which hollow members is pivotally connected to the bait, and a pivotal support for the parallelogram on the said frame, the said members being so arranged that they cause the bait to follow a vertical line in its up and down movements.

4. In combination in apparatus for drawing glass articles from a bath of molten glass, a tilting take-down frame, a bait, a pulley on the frame, an operating line for the bait extending around the pulley, means for stopping the movement of the bait, a motor, and connections for applying power from the motor to the pulley, the pulley being off center with respect to the point of its pivotal support of the frame and positioned relatively so that the application of the motive power to the pulley after the upward movement of the bait is stopped causes the tilting of the frame at an increasing speed during the first part of such tilting and at a reducing speed during the latter part of such tilting.

5. In combination in apparatus for drawing glass articles from a bath of molten glass, a tilting take-down frame, a bait, stop means for the bait, a motor for securing the upward movement of the bait, and means whereby the power of the motor is applied to tilt the frame when the bait is stopped and adapted to cause such tilting at an increased speed during the first part of the tilting and at a decreased speed during the latter part of such tilting.

6. In combination in apparatus for drawing glass articles from a bath of molten glass, a tilting take-down frame pivoted at its lower end adjacent the bath of glass, a bait and means for moving it vertically carried by the frame, an air supply, and a system of jointed arms pivotally connected to the frame and to the bait and so arranged that the bait is caused to move substantially vertically during the drawing movement thereof.

HALBERT K. HITCHCOCK.